United States Patent [19]
Olsen

[11] Patent Number: 5,501,921
[45] Date of Patent: Mar. 26, 1996

[54] FABRICATION OF ALKANE POLYMER ELECTROLYTE

[76] Inventor: Ib I. Olsen, 700 S. Saratoga Ave., #W301, San Jose, Calif. 95129

[21] Appl. No.: 232,908

[22] Filed: Apr. 25, 1994

[51] Int. Cl.$^6$ .................................................. H01M 10/40
[52] U.S. Cl. .................................................. 429/192
[58] Field of Search .............................................. 429/192

[56] References Cited

U.S. PATENT DOCUMENTS

| | | | |
|---|---|---|---|
| 4,230,549 | 10/1980 | D'Agostino et al. | 429/192 X |
| 4,654,279 | 3/1987 | Bauer et al. | 429/192 |
| 4,822,701 | 4/1989 | Ballard et al. | 429/192 |
| 5,001,023 | 3/1991 | Cheshire et al. | 429/192 |
| 5,240,791 | 8/1993 | Izuti et al. | 429/192 |
| 5,320,716 | 6/1994 | Akhtar | 429/192 X |

*Primary Examiner*—Stephen Kalafut

[57] ABSTRACT

A polymeric electrolyte comprising:

(a) an alkane monomer having 2 to 100 carbon atoms which has been functionalized with a compound which (1) is reactive with said alkane and (2) which will enable the alkane to undergo cross-linking to form a polymeric network, the number of functional groups being selected such that the polymeric electrolyte does not react with an alkali metal anode;

(b) one or more non-aqueous solvents;

(c) one or more inorganic salts which render the polymeric electrolyte conductive. The polymeric electrolyte is employed in an electrolytic cell comprising;

(i) an alkali metal anode;

(ii) a cathode; and (iii) interposed between the anode and cathode, a polymeric electrolyte.

15 Claims, No Drawings

FABRICATION OF ALKANE POLYMER ELECTROLYTE

BACKGROUND OF THE INVENTION

The present invention relates to solid state electrochemical devices and, more particularly, to solid state electrochemical devices in which the electrolyte is a polymeric network interpenetrated by an ionically conducting liquid phase.

Traditional batteries, employing aqueous solutions as the electrolytes, have given way to electrochemical devices, such as batteries and capacitors, which have a solid electrolyte. Unlike their aqueous electrolyte counterparts, the solid electrolyte devices offer the advantages of thermal stability, absence of corrosion of the electrodes, and the ability to be manufactured in thin layers.

Electrolytic cells containing an anode, a cathode and a solid, solvent-containing electrolyte are known in the art. These cells offer a number of advantages over electrolytic cells containing a liquid electrolyte, i.e., liquid batteries, including improved safety features.

The solid electrolyte is interposed between the cathode and the anode. To date, the solid electrolytes have been constructed from either inorganic or organic matrices including a suitable inorganic ion salt. The inorganic matrix may be non-polymeric [e.g, β-alumina, silver oxide, lithium iodide, etc.] or polymeric [e.g., inorganic (polyphosphazine) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, polyethylene oxide, polypropylene oxide, polyethyleneimine, polyepichlorohydrin, polyethylene succinate, and an acryloyl-derivatized polyalkylene oxide containing an acryloyl group of the formula $CH_2=CR'C(O)O-$ where R' is hydrogen or lower alkyl of from 1–6 carbon atoms.

Because of their expense and difficulty in forming into a variety of shapes, inorganic non-polymeric matrices are generally not preferred and the art typically employs a solid electrolyte containing a polymeric matrix.

One problem which research efforts have attempted to overcome in the design of solid state cells from a polymeric matrix is the poor conductivity of polymeric electrolytes at room temperature and below. In many cases, the cells which have been designed to date are used at elevated temperatures due to the low conductivity of the electrolyte at ambient temperatures.

In addition to providing a high ionic conductivity, it is important that a polymeric electrolyte also provide good mechanical strength. Unfortunately, there is a tendency for these two properties to oppose one another. Attempts to increase conductivity usually involve a reduction in molecular weight and result in fluid or mechanically weak films. Techniques, such as crosslinking, increase film strength but generally result in a loss in conductivity.

The problem of striking a suitable balance between these two mutually exclusive properties has been solved to some extent by providing a solid polymeric electrolyte which is a two phase interpenetrated network of a mechanically supporting phase of a continuous network of a crosslinked polymer and an ionic conducting phase comprising a metal salt and a complexing liquid polymer such as liquid polyethylene oxide complexed with a lithium salt, as set forth in U.S. Pat. No. 4,654,279. As explained therein, the mechanically supporting phase forms a matrix which supports an interpenetrating ionically conducting liquid polymer phase which provides continuous paths of high conductivity throughout the matrix. Representative examples of the mechanically supporting phase described in U.S. Pat. No. 4,654,279 are epoxies, polyurethanes, polyacrylates, polymethacrylates, polystyrenes and polyacrylonitriles.

The solvent (plasticizer) is typically added to the matrix in order to enhance the solubility of the inorganic ion salt in the solid electrolyte and thereby increase the conductivity of the electrolytic cell. In this regard, the solvent requirements of the solvent used in the solid electrolyte are recognized by those skilled in the art be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate,γ-butyrolactone, tetrahydrofuran, glyme (dimethoxyethane), diglime, tetraglyme, dimethylsulfoxide, dioxolane, sulfolane and the like.

The solid, solvent-containing electrolyte is typically formed in one of two methods. In one method, the solid matrix is first formed and then a requisite amount of this material is dissolved in a volatile solvent. Requisite amounts of the inorganic ion salt and the electrolyte solvent (i.e., the glyme of Formula I and the organic carbonate) are then added to the solution. This solution is then placed on the surface of a suitable substrate (e.g., the surface of a cathode) and the volatile solvent is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte.

When the solid electrolyte is formed on a cathodic surface, an anodic material can then be laminated onto the solid electrolyte to form a solid battery (i.e., an electrolytic cell).

The development of the solid polymeric electrolyte including the two phase interpenetrated network of a mechanically supporting phase of a continuous network of a crosslinked polymer and an ionic conducting phase comprising a metal salt of a complexing liquid polymer overcame to a significant extent the problem of striking a balance between good mechanical strength on the one hand and good conductivity on the other hand.

One particularly preferred solid electrolyte battery, including a crosslinked polymeric phase and an ionic conducting phase, is made employing lithium as the anode. In particular, lithium has been of interest due to its low density and highly electropositive nature. A typical cell will incorporate, for example, a lithium or lithium based anode and a cathode containing a vanadium oxide compounds, $V_6O_{13}$ as the active material. The lithium anode may be a metal foil. The electrolyte layer consists of a polymer such as polyethylene oxide and a lithium salt. The cathode structure consists of a composite material containing the active cathode material $V_6O_{13}$, a polymer electrolyte material, and carbon in the form of acetylene black. These batteries have been found to be beneficial in terms of ease of construction, ruggedness, interfacial properties, open circuit voltage, energy density, and rechargeability.

Despite its otherwise superior suitability for use in solid electrolyte batteries, the present inventor has found that in the case of highly reactive anodic metals such as lithium, the anode can actually react with the solid polymeric electrolytes. Such a reaction causes the formation of a corrosion layer between the anode and the electrolyte. Because such corrosion layer has a high resistance, it causes a significant decrease in the energy content and the peak current of the battery and thus, seriously undermines the operability of the battery.

SUMMARY OF THE INVENTION

In view of above-described shortcomings associated with prior art solid state electrochemical devices as well as other disadvantages not specifically mentioned above, it should be apparent that there still exists a need in the art for a solid state electrochemical device having a polymeric electrolyte with not only good conductivity and good strength characteristics but, in addition, a polymeric electrolyte which itself will not react with a lithium anode to form a corrosive layer as described above which can seriously interfere with the operability of the battery. More particularly, based on the finding by the present inventor that a corrosive layer can form in solid state electrochemical cells by virtue of the reaction of the solid electrolyte with lithium in an anode, it was possible to overcome such problem by providing a solid electrolyte component in a solid state electrochemical cell which does not react with a lithium anode.

More particularly, the present invention provides, in a first aspect, a polymeric electrolyte comprising:

(a) an alkane monomer having 2 to 100 carbon atoms which has been functionalized with a compound which (1) is reactive with said alkane and (2) which will enable said alkane to undergo cross-linking to form a polymeric network, the number of functional groups being selected such that said polymeric electrolyte does not react with an alkali metal anode;

(b) one or more non-aqueous solvents;

(c) one or more inorganic salts which render said polymeric electrolyte conductive.

The alkane is preferably functionalized with acrylate or methacrylate. A preferred acrylated alkane is one of the formula:

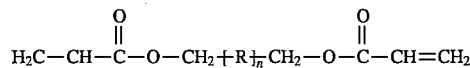

wherein n=2–100 and wherein R=—CH$_2$—CH$_2$—; —CH(CH$_3$)—CH$_2$—; or —CH(CH$_3$)—CH$_2$—CH$_2$—.

In a second aspect, the present invention relates to an electrolytic cell comprising;

(i) a lithium anode;

(ii) a cathode; and (iii) interposed between the anode and cathode, a polymeric electrolyte comprising:

(a) an alkane monomer having 2 to 100 carbon atoms which has been functionalized with a compound which (1) is reactive with said alkane and (2) which will enable said alkane to undergo cross-linking to form a polymeric network, the number of functional groups being selected such that said polymeric electrolyte does not react with an alkali metal anode;

(b) one or more non-aqueous solvents;

(c) one or more inorganic salts which render said polymeric electrolyte conductive.

With the foregoing as well as other advantages and features of the invention which will become hereinafter apparent, the nature of the invention can be better understood by reference to the Detailed Description of Preferred Embodiments as well as to the appended claims.

DETAILED DESCRIPTION OF PREFERRED EMBODIMENTS

As discussed in the Background section of the present application, electrolytic cells including a polymeric electrolyte interspersed between a cathode and an anode are well known. For the sake of completeness, a brief discussion of each of the components of such cells is now presented. However, such discussion should be viewed as merely illustrative.

As the anode component, the present invention employs alkali metals. Preferred are lithium, lithium alloys such as alloys of lithium with aluminum, mercury, nickel, zinc, and the like. The anode may also contain an electronically conductive material such as graphite and carbon black. There may be employed a lithium foil or lithium coated foil such as nickel or copper foil having a layer of lithium deposited on its surface. Lithium is preferred because it is very electropositive and light in weight.

The cathode preferably includes an intercalation or insertion metal compound. These compounds are well known in the art and include transition metal oxides, sulfides, selenides, etc. Representative materials are vanadium oxides such as $V_2O_5$ and $V_6O_{13}$, $TiS_2$. The cathode may also contain an electronically conductive material such as graphite or carbon black. Other known cathodic materials may also be employed.

The polymeric electrolyte comprises (a) an alkane monomer having 2 to 100 carbon atoms which has been functionalized with a compound which (1) is reactive with said alkane and (2) which will enable said alkane to undergo cross-linking to form a polymeric network, the number of functional groups being selected such that said polymeric electrolyte does not react with an alkali metal anode; (b) one or more non-aqueous solvents; and (c) one or more inorganic salts which renders said polymeric electrolyte conductive.

The present inventor has found that an alkane polymer electrolyte, when employed in a cell, is substantially less reactive with an anode such as lithium than are the more highly olefinically unsaturated compounds characterizing the art. The alkane polymers are prepared from alkanes having 2 to 100 carbon atoms, preferably 10 to 30 carbon atoms. The alkanes can be linear, branched or cyclic.

Quite clearly, in order for the alkanes to cross-link, it is necessary that they be functionalized with a compound. As would be readily appreciated by a person skilled in the art, there are numerous compounds which can functionalize an alkane to enable it to cross-link. Suitable compounds in this regard are those which (1) are reactive with the alkane and (2) which will enable the alkane to undergo cross-linking to form a polymeric network. Persons skilled in the art will readily appreciate the types of compounds meeting these two criteria. Examples of suitable compounds for reaction with the alkane chains are compounds including an unsaturated group such as ethylene, vinyl compounds, acrylates and methacrylates. Thiols and thiolenes may also be employed. Acrylates and methacrylates are the preferred functionalization agents.

The extent to which the alkane chains are cross-linked depends upon the particular compound used for their functionalization. They must not be functionalized to such an extent that they will include too high a proportion of unreacted unsaturated groups which could undergo an undesirable side-reaction with the anodic metal. Thus, the alkanes are functionalized enough to permit sufficient cross-linking of the polymeric electrolyte and sufficient strength to the final material. However, they are not functionalized so much that they will undergo the undesirable side reaction with the anode. The particular number of functional units which should be added to an alkane to optimize the best combination of properties will depend on the particular alkane employed. In general, where acrylate, thiol, thiolene or epoxides are reacted with the alkane, it has been found that, to provide the best overall balance of cross-linking on the one hand but absence of reaction with the anode on the other hand, there should be employed no more than 20 molar % of heteroatom per mole of carbon atoms, preferably no more than about 15 molar % of heteroatom per mole of carbon atoms. As little as 1% of heteroatom per mole of carbon atom can be used. Where the compound capable of functionalizing the alkanes is an olefinic compound without heteroatoms, there should be employed no more than about 20% molar percent of such olefinic compound.

A particularly preferred group of alkanes which are functionalized with acrylates or methacrylates are the following:

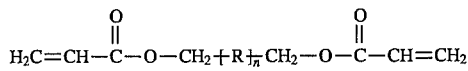

wherein n=2–100 and wherein R=—$CH_2$—$CH_2$—; —$CH(CH_3)$—$CH_2$—; or —$CH(CH_3)$—$CH_2$—$CH_2$.

They are typically prepared prior to their being combined with the other components of the polymeric electrolyte. Usually such functionalized alkanes are prepared from hydroxy end-capped alkanes which are readily available.

As discussed above, the monomer forming the polymeric matrix of the electrolyte is combined with both a solvent and an ionic salt in accordance with techniques which are well known in the art. The inorganic salt is one which renders the polymer ionically conductive and is selected from those salts conventionally used in solid state electrochemical cells. Representative examples are sodium, lithium, and ammonium salts of less mobile anions of weak bases having a large anionic radius. Examples of anions include $I^-$, $Br^-$, $SCN^-$, $ClO_4^-$, $BF_4^-$, $PF_6^-$, $AsF_6^-$, $CF_3COO^-$, and $CF_3SO_3^-$. Specific examples of inorganic salts which have been found operable in the invention include lithium tetrafluoroborate ($LiBF_4$), sodium perchlorate ($NaClO_4$), lithium perchlorate ($LiClO_4$), and lithiumtrifluorosulfonate ($LiCF_3SO_3$).

The salt may be used up to an amount which does not exceed its solubility limit in the electrolyte. The amount will therefore vary with the nature of the radiation polymerizable material and the radiation inert liquid solvent. As a general rule, the maximum amount of salt within its solubility limit should be used to maximize the ionic conductivity of the electrolyte. In most applications about 10 to 60 parts salt is used per 100 parts of radiation inert liquid phase.

The radiation inert liquids which form the ionically conductive liquid interpenetrating phase can be any low volatile aprotic polar solvent. Preferably, these materials are characterized by a boiling point greater than about 80° C. Representative examples are propylene carbonate, γ-butryolactone, 1,3-dioxolane, and 2-methyltetrahydrofuran. Less polar solvents having heteroatoms capable of bonding alkali metal catons are also useful. Low volatility simplifies manufacture and improves shelf life. Polyethylene glycol dimethyl ether (PEGDME) is a preferred example. Glymes such as tetraglyme, hexaglyme, and heptaglyme are also desirable solvents.

The radiation inert liquid is preferably an ionically conductive liquid or a liquid having heteroatoms capable of forming donor acceptor bonds with alkali metal cations. The liquid is free to interpenetrate the matrix in a 3-dimensional fashion to provide continuous paths of conductivity in all directions throughout the matrix.

The radiation curable mixture of this invention contains at least 45% by weight of the radiation inert liquid and about 15 to 55% by weight and preferably 20 to 40% by weight of the radiation polymerizable compound. The exact amount of the radiation polymerizable compound and the radiation inert liquid should be adjusted to provide the optimum combination of strength and conductivity for the particular application. As a general rule, if the mixture contains less than about 15% of the polymerizable compound, the electrolyte will be too weak to maintain electrode separation. If the mixture contains greater than about 55% polymerizable material, the electrolyte exhibits poor conductivity. In those cases in which the electrolyte composition itself or an electrode composition containing the electrolyte is coated on a supporting member such as a current collector or an electrode half element, the electrolyte often is not required to have the structural integrity of a free standing film. In those applications it is permissible and advantageous to use a higher quantity of the radiation inert liquid because greater conductivity can be achieved, for example it is advantageous to use about 70 to 80% of the radiation inert liquid.

The method of the present invention may be used to produce free standing films or electrode half elements. To produce a free standing film, the radiation curable mixture may be poured into a mold or coated onto a surface having a release characteristic such as PTFE in accordance with known techniques, as set forth in U.S. Pat. No. 4,830,939. The material is subject to radiation for curing. Cross-linking is achieved using actinic radiation which includes the entire electromagnetic spectrum and electron beam and gamma radiation. Based however on the availability of radiation sources and simplicity of equipment, electron beam and ultraviolet radiation will be used most often. Electron beam and gamma radiation are advantageous because they do not require the presence of a photoinitiator. When using electron beam, the beam potential must be sufficiently high to penetrate the electrode layer, the anode or cathode half element, or the cell itself depending upon which manufacturing technique is adopted. Voltages of 175 to 300 KV are generally useful. The beam dosage and the speed with which the element traverses the beam are adjusted to control the degree of crosslinking in an otherwise known manner.

The electrolyte is formed by preparing a mixture of a liquid comprising a crosslinkable monomer, a radiation inert ionically conducting liquid, and an ionizable ammonium or alkali metal salt, and curing the mixture by exposing it to actinic radiation. The radiation polymerizable electrolyte composition may be coated upon a support or placed in a mold prior to exposure. Exposure of the mixture produces a polymerized or crosslinked matrix which is interpenetrated in all directions by the radiation inert ionically conducting liquid phase.

The solid electrolyte of the present invention can be used in various electrochemical cells. A preferred cell consists of an alkali metal anode and an intercalary cathode having the solid electrolyte therebetween. Such structures can also employ current conducting backing layers, insulating layers and/or bipolar electrode connections in a manner known in the art. A particularly useful current conducting backing layer is aluminum foil.

A preferred polymeric electrolyte includes:
(a) 15–20% by volume of an alkane having 2 to 100 carbon atoms which has been functionalized with one to six acrylate or methacrylate groups per chain and cross-linked;
(b) 0.5–3M $LiAsF_6$ in propylene carbonate; and
(c) 0.5–5% by volume poly(ethylene oxide).

Another preferred polymeric electrolyte is:
(a) 15–20% by volume of an alkane having 2 to 100 carbon atoms which has been functionalized with one to six acrylate or methacrylate groups per chain and cross-linked;
(b) 0.5–3M $LiPF_6$ in a triglyme/propylene carbonate mixture; and
(c) 0.5–5% by volume poly(ethylene oxide).

The following example is provided by way of illustration but in no way should be construed as limiting the subject matter disclosed and claimed.

EXAMPLE 1

An electrolyte is prepared for electron beam crosslinking. The electrolyte composition comprises:
(1) 0.5–3M $LiAsF_6$ in propylene carbonate
(2) 15–25 vol % acrylated alkane having the formula:

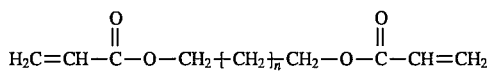

wherein n=1–25.

The mixture of liquid is coated on top of one of the electrodes whereafter it is crosslinked by exposure to the actinic radiation source. Finally the other electrode is laminated on top of the now solid electrolyte.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A polymeric electrolyte comprising:
(a) a polymeric matrix formed by polymerizing alkane monomers each having 2 to 100 carbon atoms which has been functionalized with a compound which (1) is reactive with said alkane monomers and (2) which will enable said alkane monomers to undergo cross-linking to form a polymeric network, the number of functional groups being selected such that said polymeric electrolyte does not react with an alkali metal anode;
(b) one or more non-aqueous solvents;
(c) one or more inorganic salts which render said polymeric electrolyte conductive; and
(d) 0.5–5% by volume poly(ethylene oxide).

2. The polymeric electrolyte of claim 1 wherein said alkane monomers each has 10–30 carbon atoms.

3. The polymeric electrolyte of claim 1 wherein said functional compound is a compound including a carbon-carbon double bond, a thiol compound, a thiolene compound or an epoxide.

4. The polymeric electrolyte of claim 3 wherein said compound including a carbon-carbon double bond is ethylene or a vinyl compound.

5. The polymeric electrolyte of claim 4 wherein said compound is acrylate or methacrylate.

6. The polymeric electrolyte of claim 3 wherein said alkane monomers that are functionalized with an acrylate or a methacrylate have the formula:

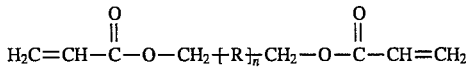

wherein n=2–100 and wherein R is $-CH_2-CH_2$; $-CH(CH_3)-CH_2-$; or $-CH(CH_3)-CH_2CH_2-$.

7. A polymeric electrolyte comprising:
(a) 15–20% by volume of a polymeric matrix formed by polymerizing alkane monomers each having 2 to 100 carbon atoms which has been functionalized with one to six acrylate or methacrylate groups per chain; and
(b) 0.5–3M $LiAsF_6$ in propylene carbonate; and
(c) 0.5–5% by volume poly(ethylene oxide).

8. A polymeric electrolyte comprising:
(a) 15–20% by volume of a polymeric matrix formed by polymerizing alkane monomers each having 2 to 100 carbon atoms which has been functionalized with one to six acrylate or methacrylate groups per chain; and
(b) 0.5–3M $LiPF_6$ in a triglyme/propylene carbonate mixture; and
(c) 0.5–5% by volume poly(ethylene oxide).

9. An electrolytic cell comprising:
(i) an alkali metal anode;
(ii) a cathode; and
(iii) interposed between the anode and cathode, a polymeric electrolyte comprising:
(a) a polymeric matrix formed by polymerizing alkane monomers each having 2 to 100 carbon atoms which has been functionalized with a compound which (1) is reactive with said alkane and (2) which will enable said alkane monomers to undergo cross-linking to form a polymeric network, the number of functional groups being selected such that said polymeric electrolyte does not react with an alkali metal anode;
(b) one or more non-aqueous solvents;
(c) one or more inorganic salts which render said polymeric electrolyte conductive; and
(d) 0.5–5% by volume poly(ethylene oxide).

10. An electrolytic cell comprising:
(i) an alkali metal anode;
(ii) a cathode; and
(iii) interposed between the anode and cathode, a polymeric electrolyte comprising:
(a) 15–20% by volume of a polymeric matrix formed by polymerizing alkane monomers each having 2 to 100 carbon atoms which has been functionalized with one to six acrylate or methacrylate groups per chain;
(b) 0.5–3M $LiAsF_6$ in propylene carbonate; and
(c) 0.5–5% by volume poly(ethylene oxide).

11. An electrolytic cell comprising:
(i) an alkali metal anode;
(ii) a cathode; and
(iii) interposed between the anode and cathode, a polymeric electrolyte comprising:
(a) 15–20% by volume of a polymeric matrix formed by polymerizing alkane monomers each having 2 to 100 carbon atoms which has been functionalized with one to six acrylate or methacrylate groups per chain;

(b) 0.5–3M LiPF$_6$ in a triglyme/propylene carbonate mixture; and (c) 0.5–5% by volume poly(ethylene oxide).

12. The electrolytic cell of claim 9 wherein said functional compound is a compound including a carbon-carbon double bond, a thiol carbon, a thiolene compound or an epoxide.

13. The electrolytic cell of claim 9 wherein said compound including a carbon-carbon double bond is ethylene or a vinyl compound.

14. The electrolytic cell of claim 13 wherein said compound is acrylate or methacrylate.

15. The electrolytic cell of claim 9 wherein said alkane monomers that are functionalized with an acrylate or a methacrylate have the formula:

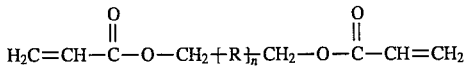

wherein n is 2 to 100 and wherein R is —CH$_2$—CH$_2$—; —CH(CH$_3$)—CH$_2$—; or —CH(CH$_3$)—CH$_2$—CH$_2$—.

* * * * *